US012063475B2

(12) United States Patent
Løngaa

(10) Patent No.: US 12,063,475 B2
(45) Date of Patent: Aug. 13, 2024

(54) REDUCING CLOCK SKEW BETWEEN CLOCK SIGNALS OF FIRST AND SECOND HEARING DEVICES

(71) Applicant: GN Hearing A/S, Ballerup (DK)

(72) Inventor: Michael Løngaa, Farum (DK)

(73) Assignee: GN HEARING A/S, Ballerup (DK)

( * ) Notice: Subject to any disclaimer, the term of this patent is extended or adjusted under 35 U.S.C. 154(b) by 154 days.

(21) Appl. No.: 17/739,046

(22) Filed: May 6, 2022

(65) Prior Publication Data

US 2022/0264233 A1 Aug. 18, 2022

Related U.S. Application Data

(63) Continuation of application No. PCT/EP2020/086245, filed on Dec. 15, 2020.

(30) Foreign Application Priority Data

Dec. 19, 2019 (EP) .................................... 19218323

(51) Int. Cl.
*H04R 25/00* (2006.01)

(52) U.S. Cl.
CPC ......... *H04R 25/505* (2013.01); *H04R 25/552* (2013.01); *H04R 25/554* (2013.01)

(58) Field of Classification Search
CPC ............ H04R 2225/55; H04R 2420/07; H04R 25/558; H04R 25/505; H04R 25/552; H04R 25/554
USPC ................................ 381/314, 312, 315, 316
See application file for complete search history.

(56) References Cited

U.S. PATENT DOCUMENTS

| | | | | |
|---|---|---|---|---|
| 10,117,203 | B2 | 10/2018 | Kindred et al. | |
| 2004/0037442 | A1* | 2/2004 | Nielsen | H04R 25/552 381/315 |
| 2013/0156215 | A1* | 6/2013 | Hickerson | H04R 1/1091 381/74 |
| 2017/0064651 | A1* | 3/2017 | Volkov | H04L 47/30 |
| 2017/0099644 | A1* | 4/2017 | Kindred | G06F 1/12 |

OTHER PUBLICATIONS

PCT Written Opinion for International Patent Appln. No. PCT/EP2020/086245 dated Feb. 18, 2021.
PCT International Search Report for International Patent Appln. No. PCT/EP2020/086245 dated Feb. 18, 2021.

* cited by examiner

*Primary Examiner* — Norman Yu
(74) *Attorney, Agent, or Firm* — Vista IP Law Group, LLP

(57) ABSTRACT

The present disclosure relates in one aspect to methods of adjusting a second system clock frequency of a slave or second device to a first system clock frequency of a first device connectable thereto via a unidirectional or bidirectional wireless data communication link so to reduce clock skew between the first and second system clock frequencies.

23 Claims, 4 Drawing Sheets

REDUCING CLOCK SKEW BETWEEN CLOCK SIGNALS OF FIRST AND SECOND HEARING DEVICES

RELATED APPLICATION DATA

This application is a continuation of International Patent Application No. PCT/EP2020/086245 filed on Dec. 15, 2020, which claims priority to, and the benefit of, European Patent Application No. 19218323.4 filed on Dec. 19, 2019. The entire disclosures of the above applications are expressly incorporated by reference herein.

FIELD

The present disclosure relates in one aspect to methods of adjusting a second system clock frequency of a second or slave head-wearable hearing device to a first system clock frequency of a first head-wearable hearing device connectable thereto via a unidirectional or bidirectional wireless data communication link so to reduce clock skew or mismatch between the first and second system clock frequencies.

BACKGROUND

Hearing systems that comprise a pair of wirelessly connected separate devices, such as first and second head-wearable hearing devices, instruments or aids, that exchange digital audio signals over a unidirectional or bidirectional wireless data communication link are known in the art. The digital audio signals may comprise respective digital microphone signal streams, or other types of digital audio streams, generated by a microphone arrangement of a first device and a microphone arrangement of second first hearing device in response to incoming sound. One or both of the first and second head-wearable hearing devices may exploit a pair of ipsilateral and contralateral microphone signals to carry out various sophisticated binaural beamforming algorithms to the respective digital microphone signal streams to provide spatial filtration of the incoming sound in each hearing aid to supply respective binaurally beamformed microphone signals to the user's left and right ears. These binaurally beamformed microphone signals may exhibit improved signal-to-noise ratio relative to monaural microphone signals delivered by each of the microphone arrangements or other types of signal enhancements exploiting binaural signal processing algorithms and mechanisms.

However, the perceptual quality of such binaurally processed microphone signals, or other types of digital audio signals, depends on accurate matching or alignment between respective system clock frequencies of the first and second head-wearable hearing devices because e.g. binaural beamforming algorithms are critically dependent on an accurate timing relationship between the ipsilateral and contralateral digital microphone signals. This accurate matching of the respective system clock frequencies represents a technical challenge because the first and second devices generally comprise separate clock generator circuits which li possess a finite precision or accuracy, like all other practical electronic circuits and components. This means that there inevitably will exist a certain deviation or mismatch between the system clock frequency of the first device and the system clock frequency of the second device. The lacking precision of the system clock generators may be caused by numerous factors like production tolerances on actual clock frequency, temperature drift, ageing effects etc. Another practical limitation in the accuracy of the system clock generators, that is particularly pronounced for devices like head-wearable hearing devices, is the size, costs and power consumption limitations imposed thereon by the miniature housing dimensions of small head-wearable communication devices like hearing aids and instruments etc.

The accuracy of a typical commercially available crystal based clock generator may be about +/−20 ppm to 30 ppm which means that the worst case difference between the clock frequencies of the first and second hearing devices may be about 60 ppm (parts-per-million). With an audio sampling frequency of about 20 kHz, this clock frequency difference or mismatch leads to an inaccurate timing relationship between the ipsilateral and contralateral digital microphone signals and also to a sample overflow event or underflow event at least one time every second in the hearing device that acts as a slave device to a master hearing device. While these sample overflow events and underflow events can be concealed or masked by various types of so-called sample re-alignment procedures or algorithms, these alignment algorithms add further undesired latency to the digital audio signals and are computationally demanding without entirely curing perceptual quality degradation of the processed digital audio signals.

Consequently, there is a need in the art for providing more accurate alignment of system clock frequencies of a pair of wirelessly connected and data communicating separate devices. Preferably, using compact, inexpensive and low-power circuits and components.

US 2017/0064651 A1 discloses a hearing system comprising a master or source hearing assistance device connected to a slave or sink hearing assistance device through a wireless communication link. The hearing system provides a time-stamp based controller for synchronization of sink or source sampling rate with an external packet rate. The hearing system utilizes arrival and departure time-stamps to obtain sample rate synchronization between the respective sample rates of the master/source hearing device and slave/sink hearing device. At the sink hearing assistance device, a difference between the arrival and departure time-stamps of a particular received data packet is used by a feedback loop controller to adjust the sample rate actuator of the slave hearing device using fractional delay techniques.

U.S. Pat. No. 10,117,203 B2 discloses a hearing assistance system including a master device and a slave device. The master device is communicatively coupled to the slave device via a wireless link. The master device has a master clock and generates master time stamps for specified events timed by the master clock. The master time stamps are sent to the slave device via the wireless link. The slave device has a slave clock and generates slave time stamps for specified events timed by the slave clock. The slave clock is adjusted for synchronization to the master clock using the master time stamps and the slave time stamps.

SUMMARY

A first aspect relates to a method of adjusting a system clock frequency of a hearing system comprising first and second devices, said method comprising:

a) establishing a wireless data communication link between the first and second devices via respective data communication interfaces, b) controlling a data transmission clock through the wireless data communication link in accordance with a first system clock frequency of the first device, c) transmitting data from the first device to the second device through the wireless data communication link, d) receiving and decoding incoming data by the data communication interface of the second device to extract a first digital audio stream, e) writing, in accordance with the data transmission clock, consecutive digital audio samples of the first digital audio stream to a receipt buffer of the second device, f) reading out from the receipt buffer the consecutive digital audio samples of the first digital audio stream in accordance with a second system clock frequency of the second device, g) increase or decrease the second system clock frequency to match the first system clock frequency based on detected overflow events and detected underflow events of, or in, the receipt buffer.

The first device of the present hearing system may comprise an audio-enabled portable device or terminal like a smartphone, laptop computer, notebook computer, tablet etc. while the second device may comprise a head-wearable hearing device such as a headset, active hearing protector or a traditional hearing aid. The audio-enabled portable device or terminal may be battery powered using a rechargeable battery arrangement or cells.

According to other embodiments of the present hearing system each of first and second devices comprises a head-wearable hearing device such as a headset, active hearing protector or a traditional hearing aid for example of so-called BTE, ITE, ITC, CIC or RIC types of hearing aid or instruments. Some embodiments of the head-wearable hearing device may comprise at least one housing portion that is shaped and sized for placement at, or in, a user's left or right ear or at least one housing portion shaped and sized for placement at or behind the user's left or right ear pinna. According to one embodiment of the present hearing system, the second head-wearable hearing device comprises an implanted component or device configured for placement in the user's skull and configured to supply an audio stimulus signal, derived from the first digital audio stream supplied by the first hearing device, e.g. hearing aid, to the user's hearing nerves via an implanted electrode array.

The data transmitted through the wireless data communication link may comprise, or be arranged as, data packets in accordance with a proprietary communication protocol or a standardized communication protocol as discussed in additional detail below with reference to the appended drawings. Certain embodiments of the present methodology are based on a bidirectional wireless data communication link while other embodiments are based on a unidirectional wireless data communication link where the data only are transmitted from the first device to the second device.

The skilled person will understand that any frequency difference or deviation between the data transmission clock, which is set by the first system clock frequency of the first device, and the second system clock frequency of the second, or slave, device, will eventually lead to underflow or overflow in the receipt buffer, because the consecutive digital audio samples are written into the receipt buffer more frequently than they are read-out again or vice versa as discussed in additional detail below with reference to the appended drawings. A corresponding underflow/overflow mechanism naturally applies to the below-mentioned transmit buffer if the second device comprises such transmit buffer. The increase or decrease of the second system clock frequency over time may been viewed as an adaptive adjustment of the latter frequency configured to minimize the frequency difference or deviation between the second system clock frequency and the first system clock frequency.

The second device may comprise the transmit buffer and the hearing system may comprise the bidirectional wireless data communication link and the present methodology may comprise:

h) writing, in accordance with a second system clock signal of the second device, preferably a head-wearable hearing device, digital audio samples of a second digital audio stream generated by the second device to a transmit buffer of the second device for temporary storage, i) reading out from the transmit buffer the consecutive digital audio samples of the second digital audio stream in accordance with the first system clock signal of the first device, j) increase or decrease the second system clock frequency to match the first system clock frequency based on detected overflow events and underflow events of the transmit buffer or detected overflow events and underflow events of the receipt buffer.

The unidirectional or bidirectional wireless data communication link may be based on near-field magnetic coupling, such as NFMI, using respective magnetic coil antennas of the first and second hearing devices. The unidirectional or bidirectional wireless data communication link may for example be using a carrier frequency between 5 and 50 MHz as discussed in additional detail below with reference to the appended drawings.

According to one embodiment of the present methodology of adjusting a system clock frequency of a hearing system step g) comprises:

increase the second system clock frequency of the second device in response to an overflow event in the receipt buffer or optionally to an underflow event in the transmit buffer if the latter is present in the second hearing device; and/or decrease the second system clock frequency in response to an underflow event in the receipt buffer or to an overflow event in the transmit buffer if the latter is present in the second hearing device.

The frequency of the second system clock may for example be adjusted in frequency steps of a predetermined size and decreased in frequency steps of a predetermined size. The increase of frequency of the second system clock may be carried out in a single frequency step, e.g. carried out by a second digital processor of the second head-wearable hearing device, in response to each overflow event in the receipt buffer and/or each underflow event in the transmit buffer; and the decrease of the second system clock frequency may likewise be carried out in a single frequency step in response to each underflow event in the receipt buffer and/or each overflow event in the transmit buffer, e.g. by the second digital processor. The predetermined size of the frequency step may for example correspond to between 0.5 ppm and 5 ppm of a nominal system clock frequency of the second device. A nominal value of the second system clock frequency of the second head-wearable hearing device may lie between 2 MHz and 64 MHz for example depending on battery resources and computational requirements of a particular type of the head-wearable hearing device. A nominal value of the first system clock frequency of the first head-wearable hearing device may lie in the same range.

A processor of the second head-wearable hearing device, e.g. a digital processor such as a software programmable CPU or software programmable or hardwired DSP, may adjust the second system clock frequency by repeatedly writing clock frequency settings to a digital control or configuration register of a system clock generator configured to generate the second system clock signal as discussed in additional detail below with reference to the appended drawings.

One embodiment of the present methodology of adjusting the system clock frequency of the second head-wearable hearing device comprises repeatedly writing, e.g. by the digital processor, such as a CPU or DSP of the second head-wearable hearing device, a current clock frequency setting to a non-volatile memory address or location of the second head-wearable hearing device. The digital processor may be configured to repeatedly writing the current clock frequency setting to the non-volatile memory address or location of a non-volatile memory, e.g. flash memory or EEPROM, of the second head-wearable hearing device in addition to the storage in the digital configuration register. The digital processor may at start-up or boot-up, e.g. caused by power-on of the second head-wearable hearing device, read the stored clock frequency setting from the non-volatile memory location and use the recovered clock frequency setting as a good starting point to a desired or target clock frequency of the master clock signal used in the opposite or first head-wearable hearing device.

According to yet another embodiment of the present methodology, each increase or decrease the second system clock frequency is followed by a delay or pause of at least 100 ms, such as more than 500 ms, without any frequency adjustment independent of any occurrence of underflow and overflow events. The pause is beneficial because it limits how fast the carrier frequency of the wireless data communication link can be changed or shifted as discussed in additional detail below with reference to the appended drawings.

The skilled person will understand that the detection of the overflow events and underflow events of the receipt buffer and/or transmit buffer may be carried out by the second digital processor in numerous way. According to one embodiment overflow events are detected in response to the receipt buffer and/or transmit buffer is full in terms of physical memory locations or addresses and underflows events are likewise detected in response to the physical memory locations or addresses of the receipt buffer and/or transmit buffer are empty. According to alternative embodiments, an overflow event is detected in response to a certain maximum memory threshold or upper limit associated with the receipt buffer and/or associated with transmit buffer is exceeded even though the buffer in question is not completely full in terms of physical storage locations or addresses. Likewise, an underflow event may be detected in response to a certain minimum, or lower, memory threshold or limit associated with the receipt buffer and/or associated with transmit buffer is crossed or exceeded even though the buffer in question is not completely empty in terms of physical storage locations or addresses. This kind of detection of the overflow and underflow events by using the maximum or minimum memory thresholds, respectively, may be viewed as detection of early warnings of upcoming overflow events or underflow events and allow the digital processor to take appropriate corrective action.

One embodiment of the present methodology which relies on detection of the overflow and underflow events by using the maximum or minimum memory thresholds, respectively, comprises:

- flagging an overflow event in the receipt buffer in response to the consecutive digital audio samples of the first digital audio stream exceeds a predetermined maximum address or threshold of the receipt buffer,
- flagging an underflow event in the receipt buffer in response to the consecutive digital audio samples of the first digital audio stream falls below a predetermined minimum address or threshold of the receipt buffer; and/or
- flagging an overflow event in the transmit buffer in response to the digital audio samples of the second digital audio stream exceeds a predetermined maximum address or threshold of the transmit buffer,
- flagging an underflow event in the transmit buffer in response to the digital audio samples of the second digital audio stream falls below a predetermined minimum address or threshold of the transmit buffer.

Each of the receipt buffer and transmit buffer may have a relatively small size for example with a storage capacity between 4 and 20 digital audio samples.

One embodiment of the present methodology uses so-called sample realignment to perceptually hide or mask audible effects of an overflow event and/an underflow event of the receipt buffer and/or transmit buffer as discussed in additional detail below with reference to the appended drawings. This sample realignment may comprise:

- carrying out sample realignment of the digital audio samples stored in the transmit buffer, for example by the second digital processor, in response to an underflow event or overflow event therein; and/or
- carrying out sample realignment of the consecutive digital audio samples stored in the receipt buffer, for example by the second digital processor, in response to an underflow event or overflow event therein.

One embodiment of the present methodology comprises:

- generating the first stream of digital audio samples by the processor of the second head-wearable hearing device by repeatedly reading the digital audio samples temporarily stored in the receipt buffer, and optionally,
- generating a second stream of digital audio samples by the digital processor of the second head-wearable hearing device by reading digital audio samples produced by a microphone arrangement of the second head-wearable hearing device in response to incoming sound. The second processor of the second head-wearable hearing device may be configured to generate various type of bilateral signals based on the first and second streams of digital audio samples for example a bilaterally beamformed microphone signal that may exhibit high directivity to effectively suppress environmental noise in the hearing aid user's sound environment and thereby improve speech intelligibility and user comfort.

A second aspect relates to a hearing system comprising: a first device comprising a first microphone arrangement, a first digital processor, a first system clock generator configured to supply a master clock signal at a master clock frequency, a first data communication interface configured for transmission and receipt of data through a wireless data communication link;

- wherein a data transmission clock of the wireless data communication link is set by the master clock frequency; and
- a second hearing device comprising a second digital processor, a second system clock generator configured to supply a slave clock signal with adjustable clock frequency, and a second data communication interface configured for receipt of the data through the wireless data communication link;

said second data communication interface and/or said second digital processor being configured to:

receiving and decoding incoming data to generate a first digital audio stream, writing, in accordance with the data transmission clock, consecutive audio samples of the first digital audio stream to a receipt buffer of the second data communication interface for temporary storage, reading out from the receipt buffer the consecutive digital audio samples of the first digital audio stream in accordance with the slave clock signal, increase or decrease a frequency of the slave clock signal to match the master clock frequency based on detected overflow events and underflow events of the receipt buffer.

The skilled person will understand that the second data communication interface and second digital processor in practice may be fully, or at least partly integrated, on a common semiconductor circuit such that the functionality of the second data communication interface may be implemented by a combination of analog and digital hardware and executable program instructions carried out by the second digital processor.

The skilled person will appreciate that certain embodiments of the second hearing device may comprise a hearing aid and additionally comprise a microphone arrangement for receipt of incoming sound. Alternative embodiments of the second hearing device such as a cochlear implant may lack its own microphone arrangement and receive a digital audio stream derived from the microphone signal of the first head-wearable hearing device via the previously discussed unidirectional or bidirectional wireless data communication link.

The second digital processor of the second device may be configured to increase or decrease the slave clock frequency in steps of a predetermined size according to the above described methodologies. The first digital processor of the first device of the hearing system may further be configured to perform hearing loss compensation of the digital audio stream derived from the microphone signal supplied by the first microphone arrangement in response to incoming sound.

A third aspect relates to a hearing device, such as the above-discussed second head-wearable hearing device e.g. a BTE, ITE, ITC, CIC or RIC type of hearing aid or the above-discussed cochlear implant. The hearing device may comprise:

an adjustable system clock generator configured to supply an adjustable system clock frequency, a digital processor operated in accordance with the adjustable system clock frequency, a data communication interface configured at least for receipt of data through a wireless data communication link; said data communication interface and/or digital processor being configured to:

receiving and decoding incoming data from the wireless data communication link to provide a first digital audio stream, writing, in accordance with a data transmission clock of the wireless data communication link, consecutive digital audio samples of the first digital audio stream to a receipt buffer for temporary storage, reading out from the receipt buffer the consecutive digital audio samples of the first digital audio stream in accordance with the adjustable system clock frequency, increase or decrease the adjustable system clock frequency to match a frequency of the data transmission clock based on detected overflow events and underflow events in the receipt buffer.

BRIEF DESCRIPTION OF THE DRAWINGS

In the following exemplary embodiments are described in more detail with reference to the appended drawings, wherein.

DETAILED DESCRIPTION

Figure 1:
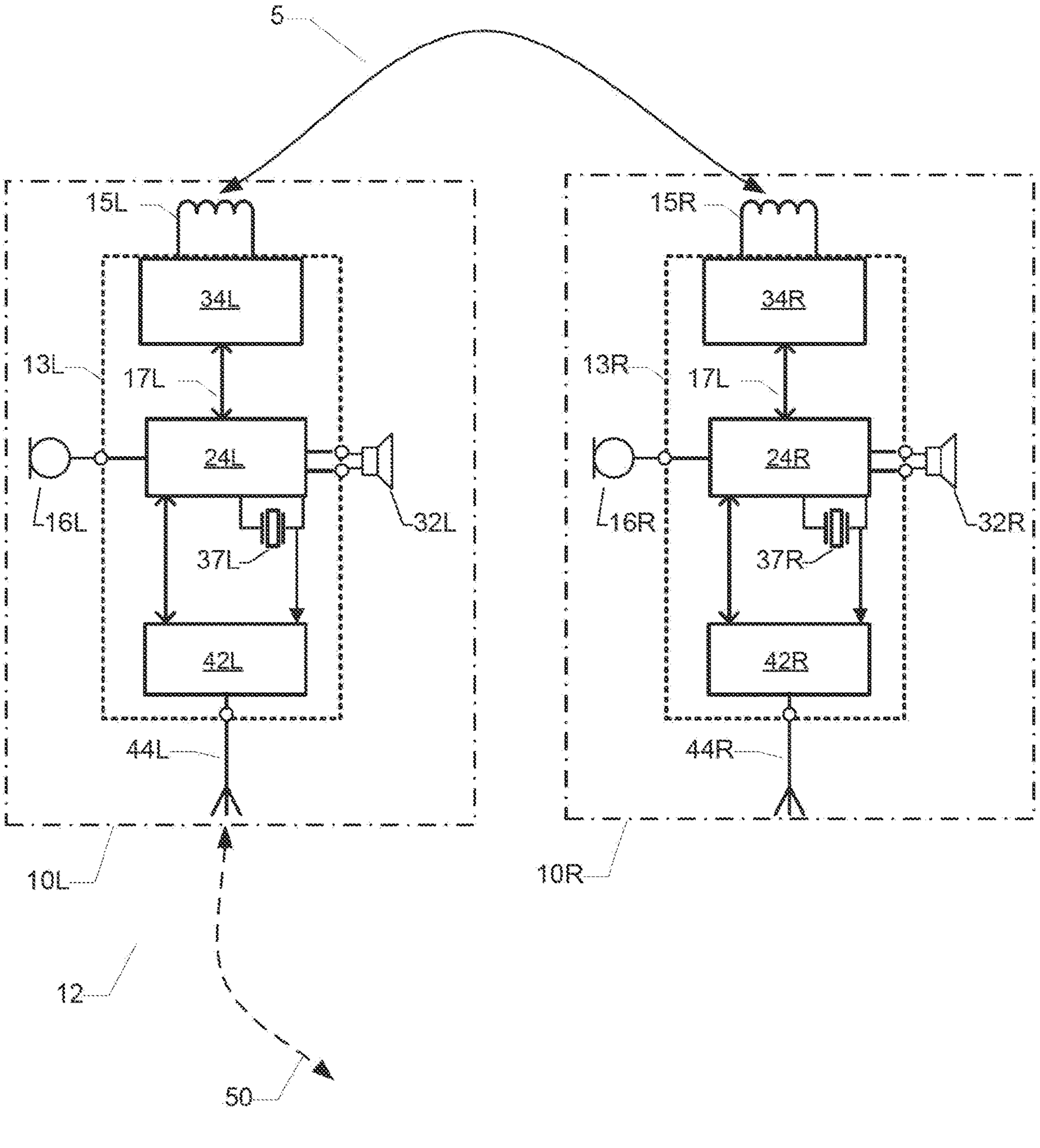
FIG. 1 schematically illustrates a binaural or bilateral hearing aid system comprising a left ear hearing aid and a right ear hearing aid connected via a bidirectional wireless data communication channel in accordance with exemplary embodiments.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 schematically illustrates a binaural or bilateral hearing system 12 comprising a left ear head-wearable hearing device or aid 10L and a right ear head-wearable hearing device or aid 10R each of which comprises at least one wireless communication interface 34L, 34R for connection to the other hearing device. In the present embodiment, the left ear and right ear hearing aids 10L, 10R are connected to each other via a unidirectional or bidirectional wireless data communication connection or link 5 which support real-time streaming of digital or digitized audio signals such as digital microphone signals at least from the left ear hearing aid 10L to the right ear hearing aid 10R but preferably transmission in both directions. Each of the left ear head-wearable hearing device 10L and right ear head-wearable hearing device 10R may comprise a traditional hearing aid for example of so-called BTE, ITE, ITC, CIC or RIC types where at least one housing portion is shaped and sized for placement at, or in, a user's left or right ear. A unique ID code or number may be associated with each of the left ear and right ear hearing devices 10L, 10R to verify identity before initializing any exchange of data. Each of the wireless communication interfaces 34L, 34R may comprise a magnetic coil antenna 15L, 15R and be based on near-field magnetic coupling such as the NFMI operating with a carrier frequency between 5 and 50 MHz such as between 5-15 MHz for example 10.66 MHz. The protocol that controls transmission and receipt of data, for example organized or structured as individual data packets, through the bidirectional wireless data communication connection or link 5 may be a proprietary protocol that is robust against EMI interference and leads to low power consumption. The data exchanged between the hearing devices 10L, 10R through the bidirectional wireless data communication connection or link 5 may comprise real-time digital audio signals, in particular various types of digital microphone signals. Each of the data packets may for example comprise a header section holding various types of protocol related parameters and control information and a payload section that comprises a plurality of digital audio signal samples such digital microphone signal samples for example between 2 and 512 digital audio signal samples.

One of the left ear and right ear hearing devices 10L, 10R of the binaural hearing system 50 is preferably assigned as master hearing device and the opposite one as a slave hearing device—for example during fitting or adaptation of the hearing system to the user. The skilled person will understand that the system clock signal of the master hearing device may control a data transmission clock or frequency on or through the bidirectional wireless data communication link 5 via a transport layer of the protocol as discussed in additional detail below. The left hearing device 10L and the right hearing device 10R may be substantially identical in terms of hardware components and circuits in certain embodiments of the present hearing system. A unique identify of each of the left ear and right ear hearing devices 10L, 10R may be provided by certain parameters, identifiers, such as the above-described unique IDs, and possible software routines. Hence, the following description of the features, components and signal processing functions of the left hearing device 10L may also apply to the right hearing aid 10R in a corresponding manner and vice versa. The left hearing aid 10L may comprise a $ZnO_2$ battery (not shown) or a rechargeable battery that is connected for supplying power to the hearing aid circuit 13L. The left hearing device 10L comprises a microphone arrangement 16L that preferably at least comprises first and second omnidirectional microphones as discussed in additional detail below.

Another embodiment of the present hearing system 50 comprises a head-wearable hearing device 10L which may comprise a BTE housing portion while the second hearing device 10R is, or at least comprises, an implanted component or device located in the user's skull and configured to supply an audio stimulus signal to the user's hearing nerves via an implanted electrode array. The left ear hearing device 10L comprises a second, optional, wireless communication interface 42L and RF antennal 44L configured to communicate through a second wireless communication link 50. The second wireless communication link 50 and interface may be configured to operate in the 2.4 GHz industrial scientific medical (ISM) band and may be compliant with a Bluetooth LE standard. This second wireless communication link 50 may provide convenient data connectivity to various types of portable communication devices like smartphones, mobile phones, tablets and personal computers etc. due to the industry standard compatible nature of the second wireless communication link 50 and interface 42L. The right ear hearing device 10R may comprise a similar optional second wireless communication interface 42R and RF antenna 44R as illustrated for the same purpose.

The right hearing device 10R additionally comprises a digital processor 24R that may comprise a hearing loss processor or algorithm and other types of microphone signal processing functions and algorithms. The skilled person will understand that each of the digital processors 24L, 24R may comprise a software programmable microprocessor such as a programmable Digital Signal Processor (DSP). The operation of the each of the left and right ear hearing devices 10L, 10R may be controlled by a suitable operating system executed on the software programmable microprocessor. The operating system may be configured to manage hearing aid hardware and software resources, e.g. including communication protocol handing, computation of monaurally or bilaterally beamformed microphone signals, hearing loss compensation processing of the microphone signal(s), the first and second wireless data communication interfaces 34L, 42L, certain memory resources etc. The operating system may schedule tasks for efficient use of the hearing device resources and may further include accounting software for cost allocation, including power consumption, processor time, memory locations, wireless transmissions, and other resources. The digital processor 24R may for example be configured to carry out monaural beamforming on the digital microphone signals supplied by microphone arrangement 16R of the right ear hearing device 10R. The digital processor 24R may additionally or alternatively be configured to carry out bilateral beamforming based on a combination of the ipsilateral microphone signal, i.e. the digital microphone signal supplied by the microphone arrangement 16R, and a contralateral digital microphone signal or signals as discussed in additional detail below. The hearing loss processor is preferably configured to compensate a hearing loss of the user or patient of the right ear hearing device 10R. For that purpose the hearing loss processor may for example comprise a well-known dynamic range compressor circuit or digital signal processing algorithm for compensation of a frequency dependent loss of dynamic range of the user—often designated recruitment in the art. Accordingly, the digital processor 24R generates and outputs a bilaterally or monaurally beamformed and microphone signal with additional hearing loss compensation to a loudspeaker or receiver 32R. The loudspeaker or receiver 32R converts the beamformed and compensated microphone signal into a corresponding acoustic signal for transmission into right ear canal of the user.

The right ear hearing device 10R additionally comprises a system clock generator or system clock circuit 37R that is configured to supply respective clock signals to one or several digital logic circuits and components of the hearing aid circuit 13L, including in particular the digital processor 24R as schematically illustrated. The RF wireless communication interface 42R is preferably clocked by the slave clock signal as illustrated where the RF wireless communication interface 42R may include a clock multiplication circuit to increase the frequency of the slave clock signal multiple times to provide the carrier frequency, e.g. 2.4 GHz, of the RF wireless communication interface 42R. The left hearing device 10L comprises a similar system clock generator 37L that is configured to supply a master clock signal (not shown) to various similar digital logic circuits and components of the hearing device 10L.

Each of the system clock generators 37L, 37R preferably comprises a crystal oscillator for good precision and stability of the master and slave clock signals. Each of the system clock generators 37L, 37R may be configured to supply or generate a nominal frequency of the master and slave clock signals between 10 MHz and 64 MHz such as about 32 MHz. The system clock generator 37L of the left ear hearing device 10L may be configured to supply a substantially fixed master clock frequency or a programmable clock frequency. The skilled person will appreciate that the roles of the system clock generators 37L, 37R as master clock generator and slave clock generator, respectively, may be interchanged as needed if the relevant hardware components and circuits of the right and left ear hearing devices 10R, 10L are identical. The operation as the master hearing device and slave hearing device may for example by defined or programmed during fitting of the hearing aid system by appropriate setting of various programming parameters in a non-volatile memory area or address (not shown) of each of the right and left ear hearing devices 10R, 10L.

As discussed above the accuracy of commercially available crystal based clock generators is limited and may possess a tolerance of about +/−30 ppm relative to a nominal clock frequency which leads to the previously discussed difference, misalignment or skew between the frequency of the master clock signal and the frequency of the slave clock signal of the left and right ear hearing devices 10L, 10R. The system clock generator 37R of at least the right hearing device 10R may be adjustable or programmable to allow the slave clock signal (not shown) to be increased or decreased in a well-defined manner for example continuously or through frequency steps relative to a nominal or current frequency of the slave clock signal. This adaptive clock frequency adjustment is preferably carried out so as to match or align the frequency of the slave clock signal to that of the master clock signal. The skilled person will understand that a sampling frequency of digital audio samples processed by the digital processor 24L of the left ear hearing device 10L may be directly proportional to, or locked to, the frequency of the slave clock signal, as provided by the system clock generator 37R, while a sampling frequency of digital audio samples processed and supplied through the wireless communication interface 34R by the digital processor 24R of the right ear hearing device 10R may be directly proportional to the frequency of the master clock signal provided by the system clock generator 37L.

Figure 2:
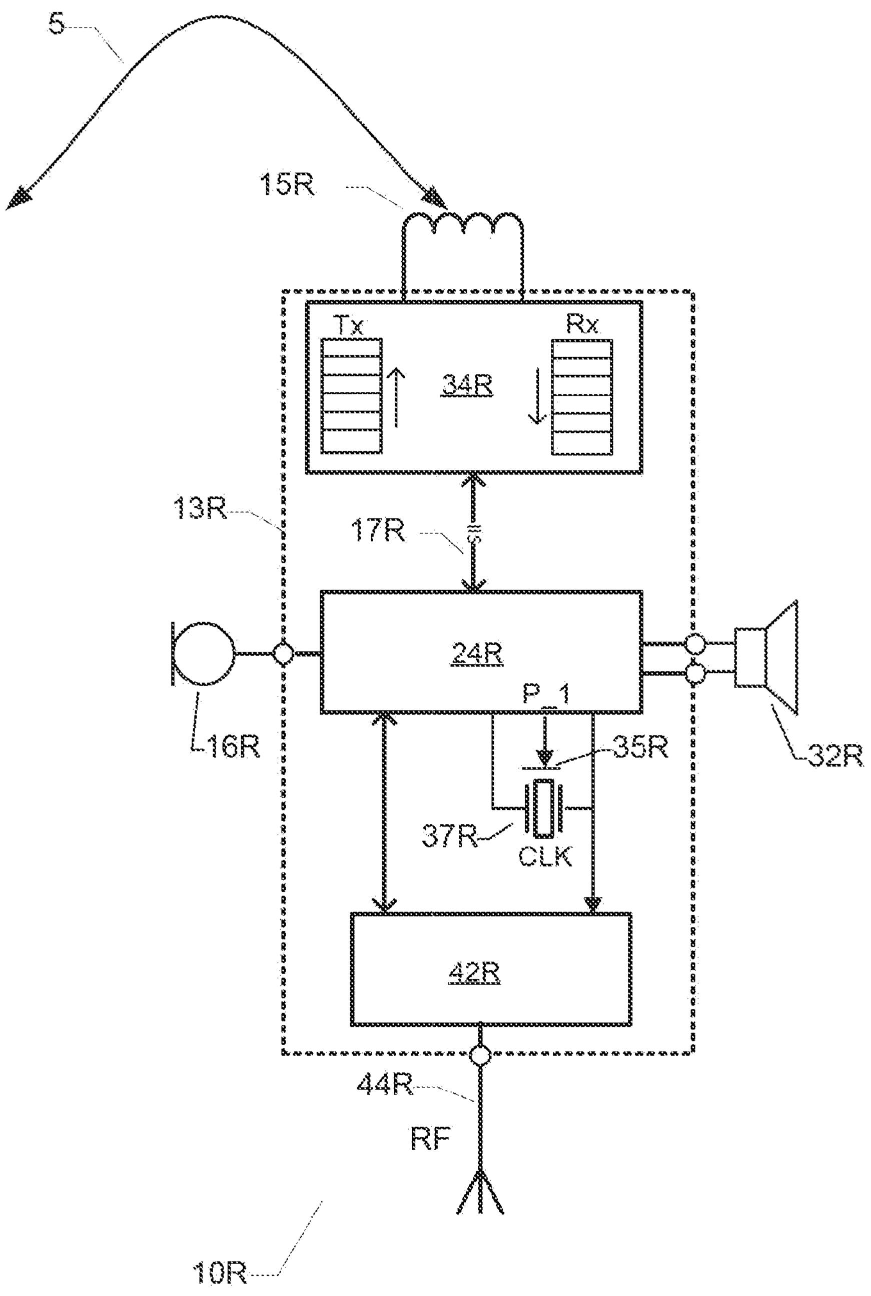
FIG. 2 shows block diagram of the right ear hearing aid of the binaural or bilateral hearing aid system operating as a slave device in accordance with the first embodiment.
Figure 3:
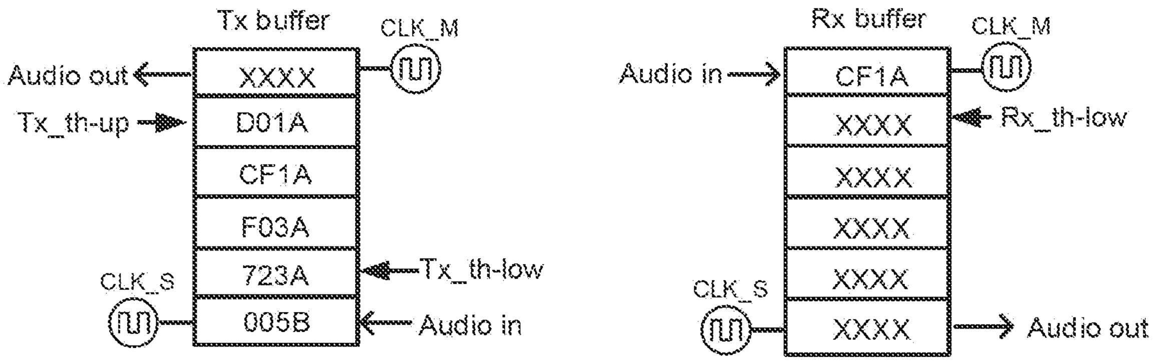
FIG. 3 schematically illustrates operation and data contents of a receipt buffer and a transmit buffer of an exemplary wireless communication interface of the right ear hearing aid.

FIG. 2 is schematic block diagram of an exemplary embodiment of the right ear head-wearable hearing device or aid 10R of the above-discussed binaural or bilateral hearing system 50. The wireless communication interface 34R is configured to receive and decode the incoming data packets from the magnetic coil antenna 15R to provide a first digital audio stream. Consecutive digital audio samples of the first digital audio stream are written to a receipt buffer Rx for temporary storage and subsequent read-out by the digital processor 24R through a proprietary or standardized bi-directional data interface 17R such as an $I^2C$ compatible interface or $I^2S$ compatible interface etc. The consecutive digital audio samples of the first digital audio stream are written to the receipt buffer Rx synchronously to the data transmission clock on the wireless channel 5, i.e. synchronously to the master clock signal, as retrieved by the wireless communication interface 34R. This process is schematically illustrated by FIG. 3 where the most recent digital audio sample, CF1A, is written to the lowest address of the receipt buffer Rx for example using an appropriately configured digital state machine or controller (not shown) of the wireless communication interface 34R clocked by, or operated synchronously to, the retrieved master clock signal CLK_M. A practical receipt buffer Rx may have a physical size to store between 4 and 40 digital audio samples such as about 5 audio samples. Each digital audio sample may comprise between 12 bits and 20 bits. A practical transmit buffer Tx may have the same storage capacity and other properties.

On the other hand the oldest, i.e. earlier received digital audio sample, XXXX, is read-out of the highest memory address or cell of the receipt buffer Rx synchronously with the slave clock signal CLK_S, because the digital processor 24R and bi-directional data interface 17R are both clocked or timed by the latter clock signal and therefore operate synchronously to the slave clock signal CLK_S. Consequently, the read-in or writing of digital audio samples to the receipt buffer Rx is controlled by the master clock signal CLK_M while read-out of the digital audio samples is controlled by the slave clock signal CLK_S. Since the system clock generators 37L and 37R are physically separate and independently operating components the inevitable deviation or mismatch between the frequencies of the master clock signal CLK_M and slave clock signal CLK_S will over time lead to either an overflow event or underflow event in the receipt buffer Rx due to the finite length/size of the buffer. If the frequency of the master clock signal is higher than the slave clock signal then the Rx buffer will overflow, i.e. run out of unused or empty memory cells or addresses, after a time interval set by the frequency deviation and size of the buffer, because digital audio samples are written into the buffer more frequently than they are read-out again.

If the frequency of the master clock signal is lower than the frequency of the slave clock signal the receipt buffer Rx will underflow in response, i.e. rendered empty of digital audio samples, after a time interval set by the frequency deviation between the master clock signal and slave clock signal and a size of the buffer in question. This happens because digital audio samples are written into the buffer less frequently than the samples are read-out again. Similarly, if the frequency of the master clock signal is higher than the frequency of the slave clock signal the receipt buffer Rx will overflow in response because the digital audio samples are written into the buffer more frequently, i.e. at a higher rate, than the samples are read-out again. Regularly occurring underflow and/or overflow events in the Rx buffer may be concealed by the digital state machine or controller of the wireless communication interface 34R using the previously mentioned sample re-alignment algorithms. The digital state machine may for example be configured to monitor the storage utilization of the Rx buffer and if latter is emptied beyond a certain or predetermined minimum address or threshold, illustrated in FIG. 3 as Rx_th-low, the digital state machine may be configured to flag or indicate an underflow event of the receipt buffer Rx to the digital processor 24R. The digital state machine may additionally proceed to repeat or copy the remaining digital audio sample CF1A to the adjacent address of the Rx buffer to prevent the Rx buffer will be empty and therefore under-flowing.

In the opposite situation where the memory cells of the Rx buffer are full or occupied so as to exceed a predetermined maximum address or threshold (not shown) of the Rx buffer, the digital state machine may for example be configured to flag or indicate an overflow event of the receipt buffer Rx to the digital processor 24R and proceed to further remove or delete a digital audio sample to prevent the Rx buffer runs out of physical memory and overflows for the latter reason. The skilled person will understand that the memory cells of each of the receipt buffer Rx and transmit buffer Tx may comprise volatile memory like RAM or register files etc. The volatile memory may be integrally formed with the digital processor 24R on a common semiconductor substrate or the volatile memory may be arranged on a separate memory device.

FIG. 3 further schematically illustrates the corresponding operation of the transmit buffer Tx where consecutive digital audio samples of a second digital audio stream generated by the right ear head-wearable hearing device 10R are written into the Tx buffer by the digital state machine of the wireless communication interface 34R for temporary storage synchronously to the slave clock signal CLK_S and hence controlled by the timing of the latter. The second digital audio stream, where the digital audio samples or signal may represent a digital microphone signal derived from the microphone arrangement 16R, may be transmitted by the digital processor 24R to the digital state machine of the wireless communication interface 34R over the bi-directional data interface 17R. The digital state machine repeatedly writes received digital audio samples to appropriate addresses or locations of the transmit buffer Tx. Concurrently, earlier stored digital audio samples are read-out of the highest memory address or cell of the transmit buffer Tx synchronously with the retrieved master clock signal CLK_M because the timing and clock frequency on the wireless communication interface 5 is controlled by the latter as outlined above. Consequently, in a corresponding manner to the receipt buffer Rx, the transmit buffer Tx will over time regularly be subjected to overflow events and/or underflow events due to the clock frequency mismatch or skew in combination with the finite length of the Tx buffer unless precautionary measures are taken as discussed below. These overflow events and underflow events in the transmit buffer Tx are preferably handled in corresponding manner to those of the receipt buffer Rx by using sample realignment when needed.

The sample realignment may be triggered by the data content, the stored digital audio samples, of the Tx buffer falls below the previously discussed minimum address or threshold or location, illustrated in FIG. 3 as Tx_th-low, or exceeds the previously discussed predetermined maximum address or threshold, illustrated in FIG. 3 as Tx_th-up. The digital state machine or controller of the wireless communication interface 34R is therefore preferably configured to flag or indicate the above-discussed overflow and underflow events in at least one of the transmit buffer Tx and receipt buffer Rx. The skilled person will appreciate that strictly speaking only one of the transmit buffer Tx and receipt buffer Rx need to be monitored for overflow and underflow events because the transmit buffer Tx and receipt buffer Rx are operating opposite to each other. In certain embodiments, the digital state machine of the wireless communication interface 34R may be configured to indicate the above-discussed overflow and underflow events in an indirect manner by flagging the corresponding sample realignment operations/events in the transmit buffer Tx and/or receipt buffer Rx. The digital state machine may therefore be configured to flag or indicate such sample realignment events to the digital processor 24R by specifically indicating in which of the Rx buffer and Tx buffer the sample realignment took place and whether the sample realignment was caused by overflow or underflow of the buffer in question.

The digital processor 24R is configured to carry out an adaptive adjustment of the frequency of the slave clock signal generated by the system clock generator 37R based on the above-discussed overflow and underflow events in the transmit buffer Tx as discussed in the following with reference to FIG. 2 and the flowchart of FIG. 4. As schematically illustrated by FIG. 2, the system clock generator 37R may comprise a digital control or configuration register 35R that can be accessed and written to by the digital processor 24R or possibly by another processor of the device circuit 13R. The digital processor 24R may for example comprise a digital output port P_1 connected to the digital control or configuration register 35R for writing clock frequency settings to the digital control or configuration register 35R—for example in terms of an absolute frequency setting or as a frequency change value e.g. increase the current clock frequency with one frequency step or decrease the current clock frequency with one frequency step. Alternatively, the wireless communication interface 34R may comprise a separate digital processor, for example a suitably configured digital state machine, that directly writes the clock frequency settings to the digital control or configuration register 35R. In both instances each frequency step of the clock configuration register may for example lead to a certain relative clock frequency adjustment for example between 0.5 ppm and 5 ppm of the nominal system clock frequency. Hence, if the nominal system clock frequency is 32 MHz, the minimum frequency step may correspond to an absolute clock frequency adjustment between 16 Hz and 160 Hz.

According to one embodiment, the digital processor 24R is configured to repeatedly write a current clock frequency setting to a non-volatile memory address or location of a non-volatile memory of the second head-wearable hearing device 10R in addition to writing to the digital control or configuration register 35R of the system clock generator 37R. At start-up or boot-up of the digital processor 24R, the latter may read the stored clock frequency setting from the non-volatile memory address or location and use this as a good starting point, i.e. relatively close to the true clock frequency of the master clock signal in the opposite hearing device 10L, for the further adjustment of the slave clock frequency. Hence, ensuring a small clock skew between the master clock signal and the slave clock signal immediately after start-up or boot of the present hearing device system instead of awaiting that the adaptive adjustment of the slave clock frequency eventually minimizes the clock skew during operation of the hearing system after each system boot.

Figure 4:
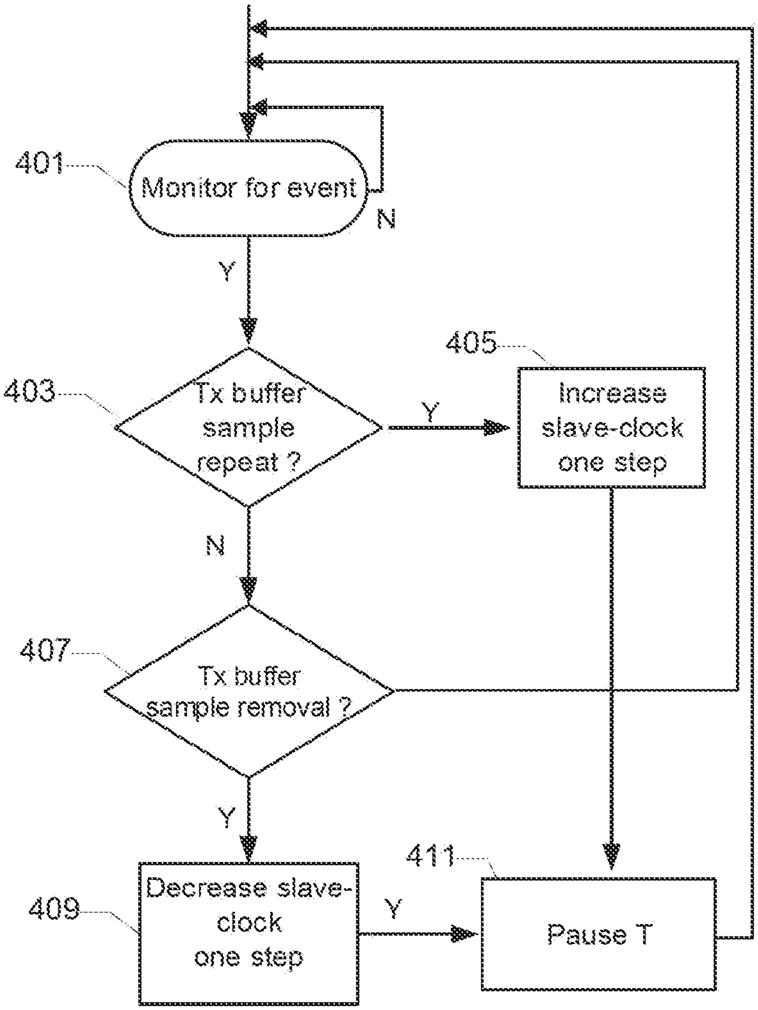
FIG. 4 is a flow chart of system clock frequency adjustments carried out by a digital processor of the right ear hearing aid in accordance with exemplary embodiments.

The adjustment of the clock frequency of the system clock generator 37R is triggered by the digital processor 24R during monitoring of the activity on the wireless communication interface 34R in step 401 of FIG. 4 in which the digital processor 24R receives an underflow event or overflow event that is flagged by the digital state machine of the wireless communication interface 34R. The digital processor 24R proceeds to step 403 in response to the detected event and checks whether the event is a sample realignment event carried out by repetition or duplication of a digital audio sample held in the transmit buffer Tx. If that is the case (Y), the digital processor 24R proceeds to step 405 and increases the clock frequency of the slave clock signal CLK_S by a single frequency step as discussed above. The increase of the clock frequency of the slave clock signal CLK_S is carried out because the repetition of the digital audio sample in the transmit buffer Tx indirectly indicates an soon to happen underflow event in transmit buffer Tx. This in turn means that the clock frequency of the slave clock signal CLK_S is lower than the clock frequency of the master clock signal CLK_M leading to a gradual empting of the transmit buffer Tx and this situation is counteracted by the increase of the frequency of the slave clock signal CLK_S. The digital processor 24R thereafter proceeds to step 411 which is an optional pause of predetermined duration where no further adjustment of the clock frequency of the slave clock signal CLK_S is carried out. The predetermined pause duration may be at least 100 ms, such as more than 500 ms. The pause may be beneficial because it limits how fast the carrier frequency of the bidirectional wireless data communication link 5 can shift assuming that the carrier frequency is derived from the system clock generator 37. A slower change of the carrier frequency of the bidirectional wireless data communication link 5 enhances the quality and stability of the wireless connection and suppresses audible artefacts in the wireless connection for example audible artefacts caused by the previously discussed sample realignment.

If the digital processor 24R in step 403 determines, in response to the sample realignment event, that the event is not (N) a repetition of a digital audio sample held in the transmit buffer Tx, the digital processor 24R proceeds to step 407 and checks whether the event is a sample removal. If the latter condition is true (Y), the digital processor 24R proceeds to step 409 and decreases the clock frequency of the slave clock signal CLK_S by a single frequency step as discussed above. If the check in step 407 instead results in a negative answer (N), the digital processor 24R may jump back to initial step 401 and await a new event. The resulting decrease of the clock frequency of the slave clock signal CLK_S in step 409 is carried out because the deletion or removal of the digital audio sample in the transmit buffer Tx indirectly indicates an overflow event in the transmit buffer Tx. This in turn means that the clock frequency of the slave clock signal CLK_S is higher than the clock frequency of the master clock signal CLK_M leading to a potential overflow of the transmit buffer Tx unless corrective action is carried out. This potential overflow situation is preferably counteracted by decreasing the frequency of the slave clock signal CLK_S. After step 409, the digital processor 24R proceeds to step 411 and holds the optional pause as discussed above. After the pause period is expired, the digital processor 24R reverts to initial step 401 where it awaits a new event.

The skilled person will appreciate that the above-described adaptive adjustment of the clock frequency of the slave clock signal CLK_S of the system clock generator 37R carried out by the digital processor 24R of the right hearing device 10R will over time tend to align the frequency of the slave clock signal CLK_S to that of the master clock signal CLK_M. The speed of this regulation loop depends inter alia on the pause period in the regulation process and the size of each frequency step of the slave clock signal CLK_S. The digital processor 24R uses the overflow events and underflow events of either the receipt buffer Rx or transmit buffer Tx to determine in which direction, i.e. up/down the current frequency of the slave clock signal must be adjusted. This process allows the frequency of the slave clock signal CLK_S to continuously or repeatedly track changes of the clock frequency of the master clock signal over time and thereby minimize clock skew between the respective clock signals of the system clock generator 37L of the left hear hearing device 10L and the system clock generator 37R of the right ear hearing device 10R.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

The invention claimed is:

1. A method performed by a hearing system, the hearing system comprising first and second devices, the method comprising:

establishing a wireless communication link between the first and second devices via respective data communication interfaces;

transmitting data from the first device to the second device through the wireless communication link;

receiving the data by the data communication interface of the second device;

decoding the data, by the second device, to extract a first digital audio stream;

writing, in accordance with a data transmission clock, digital audio samples of the first digital audio stream to a receipt buffer of the second device, wherein the data transmission clock is based on a first system clock frequency of the first device;

reading out from the receipt buffer the digital audio samples of the first digital audio stream in accordance with a second system clock frequency of the second device; and changing the second system clock frequency to match the first system clock frequency based on an overflow event and/or an underflow event of the receipt buffer of the second device.

2. The method according to claim 1, wherein the wireless communication link is bidirectional, and wherein the method further comprises:

writing, digital audio samples of a second digital audio stream generated by the second device to a transmit buffer of the second device;

reading out from the transmit buffer the digital audio samples of the second digital audio stream in accordance with the first system clock frequency of the first device; and adjusting the second system clock frequency to match the first system clock frequency based on an overflow event and/or an underflow event of the transmit buffer of the second device.

3. The method according to claim 2, wherein the second system clock frequency is adjusted by a processor of the second device writing clock frequency settings to a digital control or configuration register of a system clock generator.

4. The method according to claim 1, wherein the changing the second system clock frequency comprises:

increasing the second system clock frequency of the second device in response to the overflow event in the receipt buffer; and/or decreasing the second system clock frequency of the second device in response to the underflow event in the receipt buffer.

5. The method according to claim 1, wherein the second device comprises a transmit buffer, and wherein the method further comprises:

increasing the second system clock frequency of the second device in response to an underflow event in the transmit buffer; and/or decreasing the second system clock frequency of the second device in response to an overflow event in the transmit buffer.

6. The method according to claim 1, wherein the changing the second system clock frequency comprises increasing or decreasing the second system clock frequency in one or more frequency steps of a predetermined size.

7. The method according to claim 6, A method performed by a hearing system, the hearing system comprising first and second devices, the method comprising:

establishing a wireless communication link between the first and second devices via respective data communication interfaces;

transmitting data from the first device to the second device through the wireless communication link;

receiving the data by the data communication interface of the second device;

decoding the data, by the second device, to extract a first digital audio stream;

writing, in accordance with a data transmission clock, digital audio samples of the first digital audio stream to a receipt buffer of the second device, wherein the data transmission clock is based on a first system clock frequency of the first device;

reading out from the receipt buffer the digital audio samples of the first digital audio stream in accordance with a second system clock frequency of the second device; and changing the second system clock frequency to match the first system clock frequency based on an overflow event and/or an underflow event of the receipt buffer of the second device;

wherein the changing the second system clock frequency comprises increasing or decreasing the second system clock frequency in one or more frequency steps, wherein one of the one or more frequency steps has a predetermined size; and wherein the predetermined size is anywhere between $0.5\times10^{-6}$ times a nominal system clock frequency and $5\times10^{-6}$ times the nominal system clock frequency.

8. The method according to claim 1, wherein the changing the second system clock frequency comprises:

increasing the second system clock frequency by a single frequency step for the overflow event in the receipt buffer; and/or decreasing the second system clock frequency by a single frequency step for the underflow event in the receipt buffer.

9. The method according to claim 1, wherein the second device comprises a transmit buffer, and wherein the method further comprises:

increasing the second system clock frequency by a single frequency step for an underflow event in the transmit buffer; and/or decreasing the second system clock frequency by a single frequency step for an overflow event in the transmit buffer.

10. The method according to claim 1, further comprising repeatedly writing a current clock frequency setting to a non-volatile memory address or location of the second device.

11. A method performed by a hearing system, the hearing system comprising first and second devices, the method comprising:

establishing a wireless communication link between the first and second devices via respective data communication interfaces;

transmitting data from the first device to the second device through the wireless communication link;

receiving the data by the data communication interface of the second device;

decoding the data, by the second device, to extract a first digital audio stream;

writing, in accordance with a data transmission clock, digital audio samples of the first digital audio stream to a receipt buffer of the second device, wherein the data transmission clock is based on a first system clock frequency of the first device;

reading out from the receipt buffer the digital audio samples of the first digital audio stream in accordance with a second system clock frequency of the second device; and changing the second system clock frequency to match the first system clock frequency based on an overflow event and/or an underflow event of the receipt buffer of the second device;

wherein the changing the second system clock frequency is performed to achieve an increase or a decrease in the second system clock frequency; and wherein the increase or the decrease in the second system clock frequency is followed by a pause of at least 100 ms.

12. The method according to claim 1, further comprising flagging the overflow event of the receipt buffer in response to the digital audio samples of the first digital audio stream exceeding a maximum address or maximum threshold.

13. The method according to claim 1, further comprising flagging the underflow event of the receipt buffer in response to the digital audio samples of the first digital audio stream falling below a minimum address or minimum threshold.

14. The method according to claim 1, wherein the second device comprises a transmit buffer, and wherein the method further comprises:

flagging an overflow event of the transmit buffer in response to digital audio samples of a second digital audio stream exceeding a maximum address or maximum threshold.

15. The method according to claim 1, wherein the second device comprises a transmit buffer, and wherein the method further comprises:

flagging an underflow event of the transmit buffer in response to digital audio samples of a second digital audio stream falling below a minimum address or minimum threshold.

16. The method according to claim 1, further comprising carrying out sample realignment of the digital audio samples stored in the receipt buffer for the overflow event or for the underflow event of the receipt buffer.

17. The method according to claim 1, wherein the second device comprises a transmit buffer, and wherein the method further comprises carrying out sample realignment of digital audio samples stored in the transmit buffer for an overflow event or for an underflow event in the transmit buffer.

18. The method according to claim 1, wherein the digital audio samples of the first digital audio stream read out from the receipt buffer form a first stream, and wherein the method further comprises:

obtaining a second stream of digital audio samples provided by a microphone arrangement of the second device in response to incoming sound; and generating a bilaterally beamformed signal by the second device based on the first and second streams.

19. A hearing system comprising:

a first device comprising a first microphone arrangement, a first digital processor, a first system clock generator configured to supply a master clock signal at a master clock frequency, and a first data communication interface; and a second hearing device comprising a second digital processor, a second system clock generator configured to supply a slave clock signal with an adjustable clock frequency, and a second data communication interface;

wherein the first data communication interface is configured to transmit data for receipt by the second data communication interface via a wireless data communication link, wherein a data transmission clock associated with the wireless data communication link is based on the master clock frequency;

wherein the second device is configured to:

decode the data to generate a first digital audio stream;

write, in accordance with the data transmission clock, digital audio samples of the first digital audio stream to a receipt buffer of the second device;

read out from the receipt buffer the digital audio samples of the first digital audio stream in accordance with the slave clock signal; and change the adjustable clock frequency of the slave clock signal to match the master clock frequency based on an overflow event and/or an underflow event of the receipt buffer.

20. The hearing system according to claim 19, wherein the first data communication interface comprises a first magnetic coil antenna, and the second data communication interface comprises a second magnetic coil antenna.

21. The hearing system according to claim 19, wherein at least one of the first device or the second device comprises a head-wearable hearing device.

22. The hearing system according to claim 21, wherein the head-wearable hearing device comprises a hearing aid, a hearing instrument, a headset, or an active ear protector.

23. A hearing device comprising:

an adjustable system clock generator configured to supply an adjustable system clock frequency;

a digital processor operated in accordance with the adjustable system clock frequency; and a data communication interface configured at least for receipt of data through a wireless communication link;

wherein the hearing device is configured to:

decode the data to obtain a first digital audio stream;

write, in accordance with a data transmission clock, digital audio samples of the first digital audio stream to a receipt buffer;

read out from the receipt buffer the digital audio samples of the first digital audio stream in accordance with the adjustable system clock frequency; and change the adjustable system clock frequency to match a frequency of the data transmission clock based on an overflow event and/or an underflow event of the receipt buffer.

* * * * *